Patented May 13, 1941

2,241,488

UNITED STATES PATENT OFFICE 2,241,488

SOLUBLE ARALKYL HALIDE RESIN

William J. Sparks, Cranford, and Donald C. Field, Roselle Park, N. J., assignors to Standard Oil Development Company, a corporation of Delaware No Drawing. Application December 31, 1938, Serial No. 248,907

12 Claims. (Cl. 260—2)

This invention relates to an improved process for the polymerization of aralkyl halides and for the preparation of improved polymerization products which are soluble in organic solvents.

It has already been proposed to polymerize aralkyl halides at ordinary or elevated temperatures. The resulting products, particularly when aluminum chloride is used as the polymerization catalyst, differ materially from the products obtained by the present process.

It has now been found that improved high molecular weight polymerization products from viscous liquids to resinous solids, which are thermoplastic are obtained by polymerizing aralkyl halides with Friedel-Crafts type catalysts at temperatures substantially below room temperature, preferably between zero to —45° C. and even lower. The process is illustrated by the following example:

20 parts by volume of benzyl chloride were diluted with 50 parts of liquid propane (boiling point —45° C.). 20 parts by volume of a 1% by weight solution of aluminum chloride in ethyl chloride ($C_2H_5Cl$) was cooled by addition of 20 parts of liquid propane and the cooled mixture was added slowly with stirring to the benzyl chloride solution. A vigorous reaction ensued with rapid evolution of hydrogen chloride. On completion of the reaction, the reaction mixture was washed with alcohol to remove soluble impurities such as $AlCl_3$ and any unreacted $C_6H_5CH_2Cl$. The reaction product was then dried in an oven at 105° C. There was thus obtained a polymerization product which is a clear, hard, brittle resin at room temperature. It has a color "G" on the standard rosin scale, which is a pale yellow, and a melting point of 116° F. (method of Robert Rauh, Inc.). It is also thermoplastic over a fairly wide temperature range. This product is soluble in benzene and in other aromatic hydrocarbon solvents and in hydrocarbon halide solvents. It is insoluble in petroleum ether, and gives a cloudy solution in lubricating oil. It is relatively more soluble in the lubricants derived from aromatic or asphalt base crudes and is effective in raising the viscosity of such lubricants when added thereto in small proportions of the order of a few percent. In comparison with this resin, the reaction product of polymerization of benzyl chloride with aluminum chloride at ordinary room temperature is much darker in color and has a lower melting point, being still inferior even after careful purification to the resin described above.

Aralkyl halides in general may be used in place of the benzyl chloride in the process described above. Of these, the compounds in which the halogen is attached to the alpha carbon of the alkyl group are preferred. Examples of such compounds are alpha chlor ethyl benzene, alpha chlor propyl benzene and the like. The alkyl group may also be disubstituted as in benzal chloride, or unsaturated, as in phenyl allyl chloride. Suitable aralkyl halides for use in this reaction are readily obtainable by direct chlorination of aromatic petroleum fractions. Such fractions are obtained by extraction of petroleum naphthas with solvents having a selective solvent action for aromatic hydrocarbons, such as phenol, liquid sulfur dioxide and the like. Suitable aromatic petroleum naphthas may also be prepared by destructive hydrogenation of petroleum distillate oils at high temperatures and pressures as described in U. S. Patent No. 2,129,735.

The chlorination of these aromatic naphthas is preferably conducted by bringing chlorine directly in contact with the naphtha, the reaction being aided by light or heat or other means effective in causing the substitution of chlorine in alkyl radicals. The reaction is preferably conducted in the absence of iron salts and of other catalysts which promote the addition of chlorine on the aromatic rings. The chlorination is conducted until the chlorinated products contain about 5 to 35% by weight of combined chlorine. The total chlorinated product may then be used directly in the process of this invention, or the chlorinated compounds therein may be concentrated by fractional distillation, extraction with suitable solvents, or other suitable means. The aromatic naphthas used for the chlorination preferably boil above about 100° C. and fractions boiling between about 110 and 200° C. are especially suitable.

As the catalyst, other metal halides suitable as catalysts in the Friedel-Crafts syntheses, can be used, as for example, aluminum bromide, titanium tetrachloride and the like. These catalysts are preferably used in solution or in other highly dispersed forms, the reaction being much less satisfactory when solid aluminum chloride is used, even though it be in a finely powdered form. The catalysts may be suitably dissolved in solvents such as carbon disulfide, methyl chloride, ethylene dichloride, isopropyl chloride, chloroform, sulfuryl chloride ($SO_2Cl_2$) and the like, which may act either as solvents for the catalysts or may form liquid complexes therewith.

In preparing the preferred type of catalyst, such as the aluminum chloride-ethyl chloride mixture, it is best to dissolve the aluminum chloride in ethyl chloride at room temperature because it is relatively insoluble at the low temperatures such as −50° C. preferred for the polymerization reaction, as shown by the solubility data in the table below:

*Solubility of aluminum chloride in ethyl chloride*

| Sample | Temperature | Contact time | Per cent AlCl₃ dissolved |
|---|---|---|---|
| | °C. | Minutes | |
| Ethyl chloride and excess aluminum chloride | −78 | 60 | 0.1 |
| Do | −45 | 45 | 0.1 |
| Do | 0 | 180 | 4.4 |
| Do | +8 | 60 | 5.4 |
| Do | +12 | 180 | 7.4 |

After a substantial amount of aluminum chloride has been dissolved in desired amount up to the saturation point, the solution, if not already of the proper concentration, may be adjusted by dilution with further solvent and then cooled down to the desired temperature for the catalytic co-polymerization. Inasmuch as the AlCl₃—C₂H₅Cl complex does not precipitate out of the ethyl chloride at low temperature, even though plain AlCl₃ has a very low solubility in ethyl chloride at such temperatures, it is believed that, when aluminum chloride is dissolved in ethyl chloride, some sort of chemical reaction takes place in producing the complex, and the latter is a substantially different compound than simple aluminum chloride. If desired, the AlCl₃—C₂H₅Cl, either separated as such or else dissolved in ethyl chloride, may be dissolved in or diluted with other solvents or diluents, such as methyl chloride, chloroform, etc.

Suitable catalyst concentrations range from about 8% to about 0.5% of aluminum chloride in ethyl chloride or in methyl chloride.

The process described herein is distinguished from ordinary Friedel-Crafts reactions in that very small quantities of aluminum chloride (about 1 to 2% of the aralkyl halide) are effective in this process.

The reaction temperature is preferably maintained by addition of a volatile refrigerant which is substantially inert under the conditions of the reaction and which removes heat by evaporation at about the reaction temperature desired. Normally gaseous hydrocarbons, such as ethane, ethylene, propane, butane, and mixtures thereof, are suitable. Carbon dioxide, in liquid or solid form, may also be used. The reaction may be conducted under elevated or sub-atmospheric pressure, thus controlling the boiling point of the refrigerant used.

This invention is not to be limited by any examples or theoretical explanations, all of which are presented herein solely for purpose of illustration, but is to be limited only by the following claims in which it is desired to claim all novelty insofar as the prior art permits.

We claim:

1. Process according to claim 5 in which halogen is attached to the alpha carbon of the alkyl group of said aralkyl halide.

2. Process according to claim 5 in which the said aralkyl halide is benzyl chloride.

3. Process according to claim 5 in which the said aralkyl halide is benzal chloride.

4. Process according to claim 5 in which the said aralkyl halide comprises an aromatic petroleum fraction having chlorine substituted in the alkyl radicals thereof.

5. Process for preparing high molecular weight polymerization products comprising bringing an aralkyl halide into contact with a solution of a Friedel-Crafts catalyst in an alkyl chloride at a temperature between −45° C. and zero °C.

6. Process for preparing high molecular weight polymerization products comprising bringing an aralkyl halide into contact with a catalyst consisting of aluminum chloride dissolved in ethyl chloride, at a temperature between −45° C. and zero °C.

7. Process for preparing normally solid resinous polymerization products comprising bringing an aralkyl halide into contact with a catalyst consisting of aluminum chloride dissolved in ethyl chloride, at a temperature of about −45° C.

8. Process according to claim 7 in which the reaction temperature is maintained by addition of an inert volatile refrigerant.

9. Process according to claim 7 in which the reaction temperature is maintained by addition of liquid propane.

10. A process for preparing high molecular weight polymerization products comprising the steps of bringing an aralkyl halide into contact with a solution of a Friedel-Crafts catalyst in an alkyl chloride at a temperature between −45° C. and 0° C. in the presence of a refrigerant comprising solid carbon dioxide.

11. A process for preparing high molecular weight polymerization products comprising the steps of bringing an aralkyl halide into contact with a solution of a Friedel-Crafts catalyst in an alkyl chloride at a temperature between −45° C. and 0° C. in the presence of a refrigerant comprising liquid propane.

12. A process for preparing high molecular weight polymerization products comprising the steps of bringing benzyl chloride into contact with a solution of aluminum chloride dissolved in an alkyl chloride at a temperature between −45° C. and 0° C. in the presence of a refrigerant comprising solid carbon dioxide.

WILLIAM J. SPARKS.
DONALD C. FIELD.